United States Patent
Tortora

(10) Patent No.: US 8,430,517 B2
(45) Date of Patent: Apr. 30, 2013

(54) DEVICE FOR COLLIMATING, MAKING UNIFORM AND EXTRACTING LIGHT FOR LIGHTING A DISPLAY DEVICE

(75) Inventor: Pierpasquale Tortora, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 231 days.

(21) Appl. No.: 12/967,711

(22) Filed: Dec. 14, 2010

(65) Prior Publication Data

US 2011/0149603 A1    Jun. 23, 2011

(30) Foreign Application Priority Data

Dec. 17, 2009  (EP) .................................... 09179641

(51) Int. Cl.
*G01D 11/28*   (2006.01)
*F21V 8/00*    (2006.01)

(52) U.S. Cl.
USPC ........ 362/23.09; 362/600; 362/611; 362/612; 362/615; 362/616

(58) Field of Classification Search .................... 362/26, 362/600, 611, 612, 615, 616
See application file for complete search history.

(56) References Cited

U.S. PATENT DOCUMENTS

| | | | |
|---|---|---|---|
| 5,984,485 A * | 11/1999 | Poli et al. .......................... | 362/26 |
| 6,183,099 B1 * | 2/2001 | Garay et al. ..................... | 362/26 |
| 7,063,429 B2 * | 6/2006 | Hirano et al. .................... | 362/26 |
| 7,223,009 B2 * | 5/2007 | Henriet et al. ................. | 362/617 |
| 8,172,447 B2 * | 5/2012 | Meir et al. ..................... | 362/616 |
| 2003/0147232 A1 | 8/2003 | Kraft | |
| 2006/0139580 A1 | 6/2006 | Conner | |
| 2006/0227302 A1 | 10/2006 | Harbers et al. | |
| 2006/0274621 A1 | 12/2006 | Nagabuchi | |
| 2009/0167651 A1 | 7/2009 | Minano et al. | |

FOREIGN PATENT DOCUMENTS

WO    2007/014371 A2    2/2007

OTHER PUBLICATIONS

Search Report issued in the corresponding European application No. EP09179641, completed Mar. 25, 2010.
Office Action issued in corresponding Chinese application 20100600924.7 on Oct. 26, 2012.

* cited by examiner

*Primary Examiner* — Stephen F Husar
*Assistant Examiner* — James Cranson, Jr.
(74) *Attorney, Agent, or Firm* — Griffin & Szipl, P.C.

(57) ABSTRACT

Lighting system for a data display device (56), said lighting system including a light guide (30) into which the light produced by a light source (38) is injected, said lighting system being characterized in that the light guide (30) includes a plane light injection and collimation zone (32) in the form of a parabola, said parabola including two branches (48a, 48b) connected to each other via an apex (40), the light source (38) being arranged opposite the apex (40), the branches (48a, 48b) of the parabola which delimit the contour of the plane injection and collimation zone (32) being extended by a plane extraction zone (36) for the light propagating inside the guide (30), said extraction zone (36) having a rectangular section and being provided with light extractors (54).

12 Claims, 5 Drawing Sheets

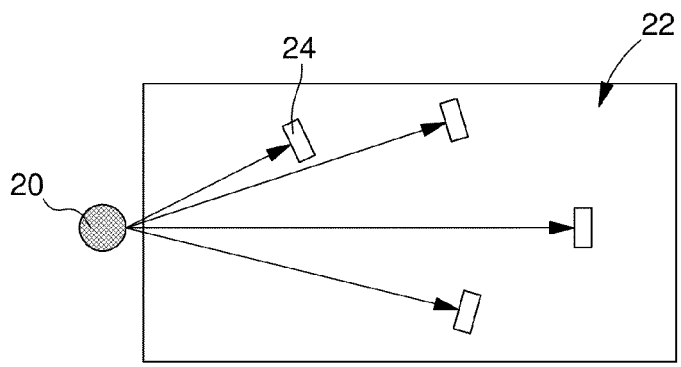
Fig. 4A
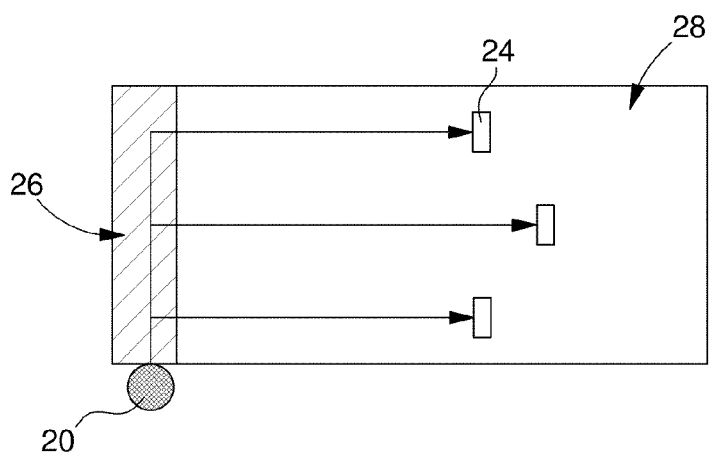
Fig. 4B
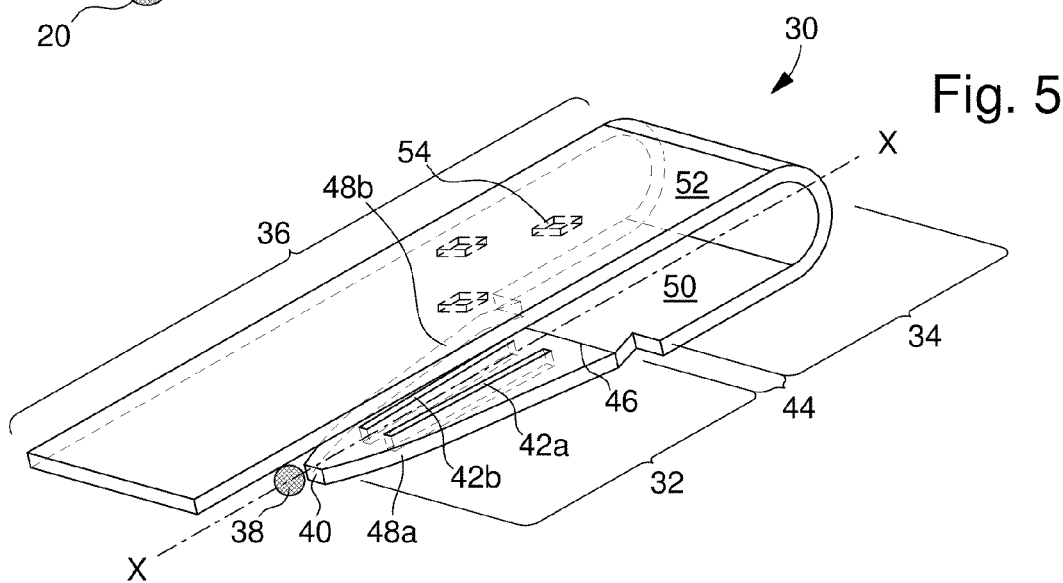
Fig. 5
Fig. 6A
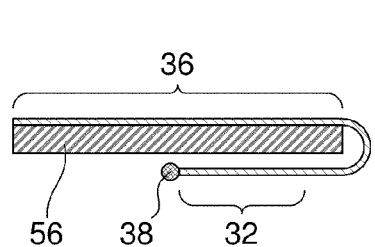
Fig. 6B
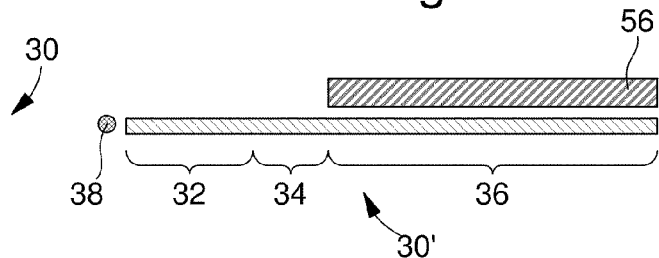

DEVICE FOR COLLIMATING, MAKING UNIFORM AND EXTRACTING LIGHT FOR LIGHTING A DISPLAY DEVICE

This application claims priority from European Patent Application No. 09179641.7 filed Dec. 17, 2009, the entire disclosure of which is incorporated herein by reference.

FIELD OF THE INVENTION

The present invention concerns a device for collimating, making uniform and extracting light for lighting a display device. More specifically, the present invention concerns a device of this type for collimating the propagation direction of a light beam so as to facilitate extraction of the light for lighting the display device.

BACKGROUND OF THE INVENTION

A reflective display device such as a liquid crystal cell has to be lit by the front face thereof, i.e. on the side where information is displayed. Thus a lighting system, commonly called a front-lighting system is used. Various embodiments of front-lighting systems are known in the state of the art but, until now, they have found little application in the market. This is due in particular to the fact that it is difficult to make a front-lighting system that has a high level of lighting efficiency without the structures involved making the displayed information difficult to read. Moreover, the yield of currently known front-lighting systems is not very satisfactory in terms of the electric power consumed and the optical power returned and the cost price thereof makes them hardly compatible with the requirements of industrial manufacture.

The system most often envisaged for making a front-lighting device adopts the operating principles of a back-light type lighting device. This type of back-lighting device is shown schematically in FIG. 1, annexed to this patent application. Designated as a whole by the general reference number 1, the back-lighting device includes a plane, transparent light guide 2 arranged underneath a data display device 4 that is to be lit, such as a liquid crystal cell. A light source 6 injects light into guide 2 through one side thereof. Light guide 2 is machined so as to create light extractors 8 therein which deviate part of the light propagating inside guide 2 towards display device 4. Light extractors 8 may be microprisms, micro-lenses, a diffractive array or other. The assembly is completed by a mirror 10 arranged beneath the light guide 2. Of course, the data display device 4 is of the transmissive type.

Application of the back-light system to a reflective type of data display device is illustrated in FIGS. 2A and 2B annexed to this patent application. In this case, a plane, transparent light guide 12 is arranged above a reflective type of data display device 14 which has to be lit, such as a reflective liquid crystal display cell. In photopic vision, sunlight passes through light guide 12 and is reflected by display cell 14 so as to pass through light guide 12 again and reach the observer. In scotopic vision, the light produced by a light source 16 is injected through one side of light guide 12 and is deviated by extractors 18 (microprisms, micro-lenses, diffractive array) in the direction of display cell 14. The light is finally reflected by display cell 14 through light guide 12 towards the observer.

In the case of a system for injecting light into a light guide of the type described above, the first parameter to be optimised is the uniformity of the luminous flux in the entire section of the light guide. This condition is important for guaranteeing uniform illumination of the display device across the entire surface thereof. As shown in FIG. 3, annexed to this patent application, the uniformity of illumination of display device 14 in the direction of the length L of light guide 12 is determined by the distribution of extractors 18 over the surface of guide 12. As regards the uniformity of illumination of display device 14 in the direction of width I of light guide 12, this depends upon the geometry of light guide 16.

Thus, in the case of devices which are not subject to constraints in terms of electric power consumption such as, for example, liquid crystal computer screens, the typical geometry of light source 16 is that of a fluorescent tube known as a cold cathode fluorescent lamp or CCFL, the length of which substantially corresponds to the width of the liquid crystal display device. However, although these fluorescent tubes are becoming increasingly efficient from the point of view of yield, the electric power consumption thereof still remains incompatible with use in portable electronic devices such as, for example, watches, whose energy reserves are necessarily limited.

Consequently, the light sources most commonly used in these portable objects such as wristwatches are light emitting diodes or LEDs. Light emitting diodes are characterized notably by a high level of luminance insofar as their entire luminous energy is emitted from a small surface and they have a higher conversion yield than all conventional light sources as regards the electric power consumed and the optical power provided. However, it is difficult to illuminate a display device in a uniform manner using a light emitting diode due to the reduced dimensions of a diode of this type.

FIGS. 4A and 4B annexed to this patent application illustrate two solutions commonly used in current devices for injecting the light produced by a light emitting diode. In the first case (FIG. 4A), the light emitting diode 20 is placed directly opposite the input of light guide 22. This configuration produces a high injection yield for the light produced by light emitting diode 20. However, because of the luminous emitting lobe typical of a light emitting diode which is of the Lambertian type, the light inside guide 22 propagates in a large number of different directions. The light extraction efficiency of extractors 24 essentially depends on their orientation relative to the light propagation direction. Thus, both in the design phase and in the manufacturing phase of light guide 22, the orientation of each extractor 24 must be determined and controlled relative to the position of light emitting diode 20. This becomes a complex task if light extractors 24 are microprisms, and almost impossible to resolve if it is desired to use a diffractive array. Indeed, in this latter case, a diffractive array with a curved line profile would have to be developed. Moreover, with this injection system, side lighting is not uniform given that because of the lobe-shaped emission profile of the light emitting diode, the light injection yield is higher at the small injection angles than at the large injection angles.

In the second case illustrated in FIG. 4B, the light is first injected into a reflective/refractive structure 26, which has the capacity to reflect light into guide 28 in substantially parallel propagation directions. With this type of arrangement, most of the light rays propagate parallel to the axis of light guide 28. However, for light injection into guide 28 to be homogeneous, deflector 26 must be designed to be able to inject a constant quantity of light over the entire width of guide 28. This arrangement is preferably used when good quality lighting (collimation) is desired for the display device rather than intense lighting. In fact, the efficiency of the injection coupling of light into the guide is generally less than one third of the initial optical power of the light source.

From the foregoing it is clear that, depending on the solution retained for injecting light produced by a light source into a light guide, priority is given either to the efficiency of light injection into the guide and thus the quantity of light which will eventually light the display device, or the uniformity of the light injected into the guide and thus the lighting quality of the display device. To the Applicant's knowledge, there does not exist a lighting device which lights a display device in both a luminous and uniform manner.

To respond to this need, in addition to others, in the state of the art, the present invention provides a lighting system for a data display device that guarantees excellent coupling efficiency of the light injection into the light guide according to the invention as well as a high collimation level of the luminous flux propagating in the light guide.

SUMMARY OF THE INVENTION

The present invention therefore concerns a system for lighting a data display device, this lighting system including a light guide into which the light produced by a luminous source is injected, said lighting system being characterized in that the light guide includes a plane light injection and collimation zone in the form of a parabola, said parabola including two branches connected to each other via an apex, the light source being arranged opposite the apex, the branches of the parabola that delimit the contour of the plane injection and collimation zone being extended by a plane zone for extracting the light propagating inside the guide, said extraction zone having a rectangular section.

Owing to these features, the present invention provides a system for lighting a data display device including a light guide with a high light injection yield owing to optimal coupling efficiency between the light source and the guide and a high collimation level of the light propagating in said guide. The light guide thus firstly includes a plane light injection and collimation zone in the form of a parabola, the light source being placed opposite the apex of the parabola. Since the apex of the parabola has a relatively small surface and the light source is placed directly opposite this surface, this guarantees an excellent injection yield of the light into the light guide. In other words, the high coupling efficiency between the light source and the light guide optimises the ratio between the luminous power produced by the light source and the electric power consumed by said source. Thus a higher level of luminous power is available for lighting the data display device. Moreover, the parabolic shape of the injection and collimation zone of the light guide enables the light to propagate inside the guide in homogeneous parallel directions with uniform distribution of the luminous flux in the section of the guide.

On exiting the injection and collimation zone, the light propagates inside the plane light extraction zone in which the luminous flux receives the final adjustments prior to extraction which result in uniform distribution of the light in the section of the guide and in parallel rays. Thus the high degree of light collimation considerably simplifies the work of designing and manufacturing the light guide. Indeed, owing to the present invention, it is not necessary to orient the light extractors in accordance with the position of the light source, but only relative to the general direction of propagation of the light in the guide, which is much simpler. If light extraction is performed using diffractive arrays, the orientation of the array lines can be selected such that light extraction is optimal. Further, the orientation of the diffractive array lines remains unchanged over the entire surface of the guide.

According to a complementary feature of the invention, the collimation zone includes two rectilinear slots arranged on either side of the axis of symmetry of the parabola, the two slots moving away from each other in the direction of the light extraction zone.

It has been noted that the planar injection and collimation zone in the form of a parabola tends to concentrate the light slightly on the sides of the guide rather than in the centre. To overcome this problem, two slots that are slightly inclined relative to the axis of symmetry of the structure are made in the surface of the injection and collimation zone. These two slots enable more rays to converge at the centre of the structure, while further improving the uniformity of light in the section of the guide.

To improve still further the uniformity of the luminous flux in the entire section of the light guide, an intermediate zone of trapezoidal shape is inserted between the collimation zone and the light extraction zone, the trapezium being an isosceles trapezium connected via the large base thereof to the branches of the parabola delimiting the collimation zone.

If it is wished to light the data display device via the top, the injection and collimation zone is extended via an intermediate zone including a first plane portion of rectangular section followed by a second semi-cylindrical portion, followed in turn by a third plane portion of rectangular section which extends parallel to the first plane portion and which serves as a light extraction zone. The data display device is arranged between the first and third plane portions of the light guide so as to cover the light source and the injection and collimation zone and be covered in turn by the third plane light extraction portion. In this case, the display device, for example a liquid crystal display device, must be reflective. The display device thus allows the light source and part of the light guide to be totally hidden from the observer's view. In particular, the user cannot see the halo of light or "hot spot" produced by the light source, and thus cannot locate the position of this light source. Moreover, the fact of bending the light guide by 180° means that a compact lighting system is obtained which does not exceed the dimensions of the display device but yet does not sacrifice the action of collimating and making the luminous flux uniform by the light guide. Indeed, the light beam which is propagating in the light guide according to the invention is injected, collimated and made uniform in the part of the guide that is covered by the display device which is to be lit and the length of which is sufficient for the light to be collimated and made uniform. It is thus sufficient then to introduce, into the light guide, a bent portion that leads the light towards the top of the display device to be lit.

The light source used in conjunction with the light guide according to the invention is a pinpoint light source such as an incandescent light bulb or preferably a light emitting diode. Thus, owing to the present invention, it is possible, by means of a pinpoint light source, to light a wide surface corresponding to the section of the light guide, in a perfectly uniform manner.

BRIEF DESCRIPTION OF THE DRAWINGS

Other features and advantages of the present invention will appear more clearly from the following detailed description of one embodiment of the lighting system according to the invention, this example being given solely by way of non-limiting illustration with reference to the annexed drawing, in which:

FIGS. 4A and 4B, already cited, are schematic diagrams illustrating the injection of light into a planar light guide using an LED pinpoint light source;

FIG. 5 is a perspective view of the light guide according to the present invention;

FIG. 6A is a schematic diagram illustrating the application of the light guide shown in FIG. 5 to front lighting a reflective data display device such as a liquid crystal cell;

FIG. 6B is a schematic diagram of a variant of the light guide according to the invention used for back lighting a transmissive data display device such as a liquid crystal cell;

DETAILED DESCRIPTION OF THE PREFERRED EMBODIMENTS

Figure 1:
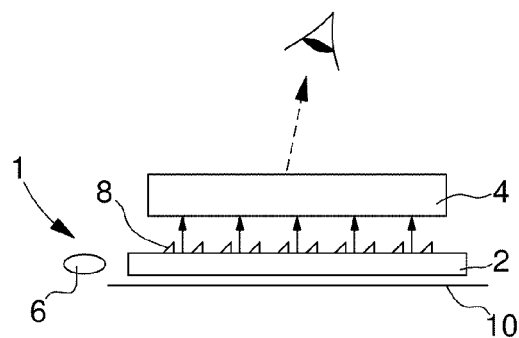
FIG. 1, already cited, is a schematic diagram of a back light device for a transmissive type data display device such as a liquid crystal display cell.
Figure 2A:
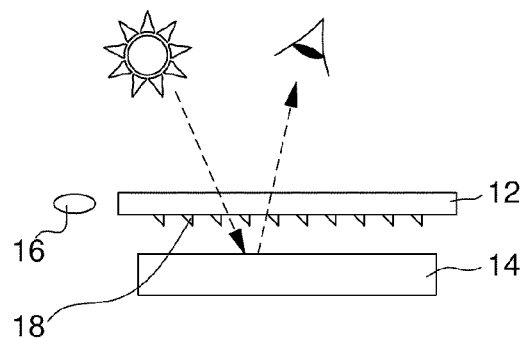
FIGS. 2A and 2B, already cited, are schematic diagrams in photopic and scopotic vision of a front lit reflective data display device such as a liquid crystal display device.
Figure 2B:
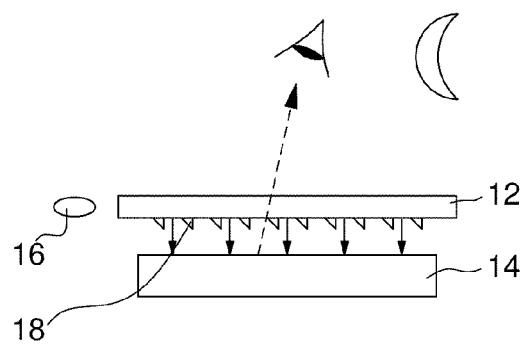
Figure 3:
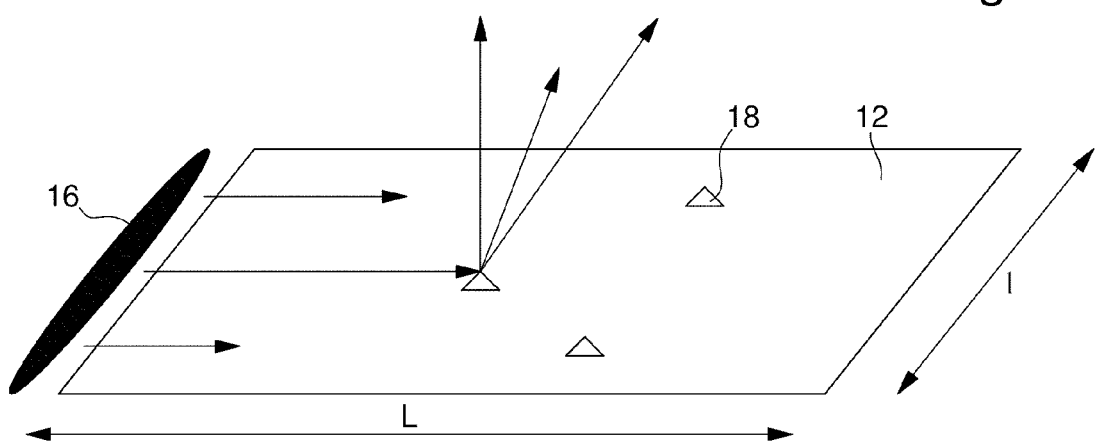
FIG. 3, already cited is a schematic diagram illustrating the injection of light into a planar light guide by means of a wide light source.

The present invention proceeds from the general inventive idea that consists in providing a light guide for lighting a data display device that has both an excellent light injection yield and excellent properties of collimating and making light uniform in the entire section of said guide. Owing to this light guide, the lighting of the display device is both luminous and constant over the entire surface of the display device. To achieve this objective, the present invention discloses a light guide which includes at least one plane light injection and collimation zone of parabolic shape followed by a plane light extraction zone of constant rectangular shape. The light source is placed opposite the apex of the parabola such that the light injection surface is reduced and the light injection yield is therefore high. Because of its parabolic shape, the injection zone of the light guide according to the invention further enables the injected light to propagate along parallel directions to the axis of the parabola. It is thus a uniform luminous flux whose rays propagate in parallel directions which penetrates the plane light extraction zone so as to be reflected towards the display device to be lit. Since the direction of propagation of light in the guide is well defined, it is easy to determine the orientation of the light extractors (microprisms, micro-lenses, diffractive array or other) for optimum light extraction efficiency.

The present invention will be described in relation to a data display device of the liquid crystal cell type which may be either reflective or transmissive. It goes without saying however that this example is given purely by way of illustration and that the data display device can be of any type, such as an electrophoretic or cholesteric display device, a micro-opto-electromechanical system (MOEMS), an electro wetting display device or even a watch dial for example.

FIG. 5 is a perspective view of a light guide according to the invention. Designated as a whole by the general reference number 30, this light guide essentially includes a plane light injection and collimation section 32 followed by a plane light transmission section 34, followed in turn by a plane light extraction section 36.

As is visible in the drawing, the injection and collimation section 32 is of parabolic shape, with light source 38 placed opposite the apex 40 of the parabola. This configuration enables light to be injected into guide 30 with an even greater increase in efficiency since the incident angle of the light rays that penetrate the guide is greater than the total reflection angle of the guide. Consequently, there is total light reflection at the interface between the guide and the ambient air. It is not, therefore, necessary to use artifices such as metallising the light guide periphery to ensure that light does not escape from the guide. Moreover, the parabolic shape of the injection and collimation zone has the effect of collimating the light beams emitted by light source 38 in propagation directions parallel to the axis of symmetry X-X of the parabola.

Since it was observed that injection and collimation section 32 tended to concentrate the light slightly more on the edges of the parabolic profile rather than at the centre of the structure, it is possible, incidentally, to make two rectangular slots 42a and 42 in injection and collimation section 32 arranged symmetrically on either side of the axis of symmetry X-X of the parabola. These two slots 42a and 42b move slightly away from each other at a preferred angle of 3° in the light propagation direction inside guide 30 and have the effect of directing more light rays to the centre of guide 30 while improving the uniformity of light distribution inside the section of guide 30.

Light injection and collimation section 32 is extended by a plane light transmission section 34. By way of variant, an isosceles trapezium-shaped section 44, connected via the large base 46 thereof to branches 48a and 48b of parabolic injection and collimation section 32, can be made between injection and collimation section 32 and transmission section 34. This trapezoidal section 44 reinforces the improved uniformity effect of injection and collimation section 32.

The plane light transmission section 34 includes a first plane portion 50 of rectangular shape extended by a second semi-cylindrical portion 52, which is in turn extended by light extraction section 36, which extends parallel to and at a distance from the first plane portion 50. In the first plane portion 50 of light transmission section 34, the luminous flux receives the final alterations which result in uniform distribution of light inside the section of guide 30 and in the parallel propagation directions of the light beams. Once the properties of uniformity and parallelism have been optimised, the light follows its path through semi-cylindrical portion 52 of transmission section 34 which bends the rays by 180° to inject said rays into the planar light extraction section 36. Light extraction section 36 is of rectangular shape and is fitted with optical extractors 54 for extracting light from guide 30. These optical extractors 54 may either be microprisms, micro-lenses or even a diffractive array. Since the light in guide 30 has high levels of uniformity and parallelism, the arrangement of optical extractors 54 is considerably simplified.

Figure 6C:
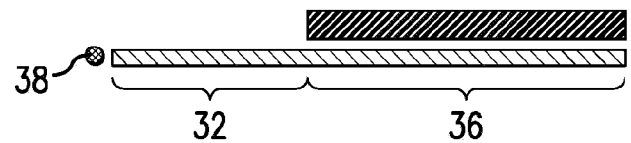
FIG. 6C is a schematic diagram of a simplified embodiment of the light guide according to the invention.

FIGS. 6A and 6B illustrate schematically two examples of use of a light guide according to the invention. In FIG. 6A, light guide 30 described above is used for front lighting a reflective data display device 56 such as a liquid crystal display cell. Display cell 56 is thus arranged between the injection and collimation section 32 and light extraction section 36. As can be seen upon examining the drawing, the lighting system formed by light guide 30 and lighting source 38 is very compact and barely exceeds the dimensions of liquid crystal cell 56. Moreover, light source 38 and a part of light guide 30 are concealed from the observer's view. FIG. 6B shows the application of the light guide according to the invention to lighting a transmissive data display device 58 such as a liquid crystal display cell. According to this embodiment, light guide 30' has no semi-cylindrical portion and is formed solely of injection and collimation section 32 followed by transmission section 34 and light extraction section 36. In a simplified embodiment of the invention, transmission section 34 can be omitted and injection and collimation section 32 is directly connected to light extraction section 36 (see FIG. 6C). It will be noted that light source 38 may be any type of pinpoint light source such as an incandescent lamp or a light emitting diode.

The optical performance of light guide 30 described above was digitally analysed using Zemax Ray tracing software. The material chosen for manufacturing light guide 30 in the simulations is BK7 glass. However, the behaviour of light guide 30 remains very similar if it is made of a plastic material. In this latter case, the light guide according to the invention can be fabricated very simply by plastic injection moulding. The light guide 30 used in the simulation has a uniform thickness of 0.4 mm and its geometry can light a reflective data display device 56 with dimensions of 6×16 mm. The inner radius of curvature of semi-cylindrical portion 52 is 0.95 mm. The light source 38 used is a light emitting diode available from Kingbright catalogues with a wavelength of 0.55 μm. As it is sought, above all, to evaluate the properties of the light in the part of guide 30 that covers the display device, in other words in light extraction section 36, the light sensor is placed at the output of guide 30, i.e. on the opposite side to injection and collimation zone 32. The dimensions of the photometric sensor exactly match the section of light guide 30.

Figure 7A:
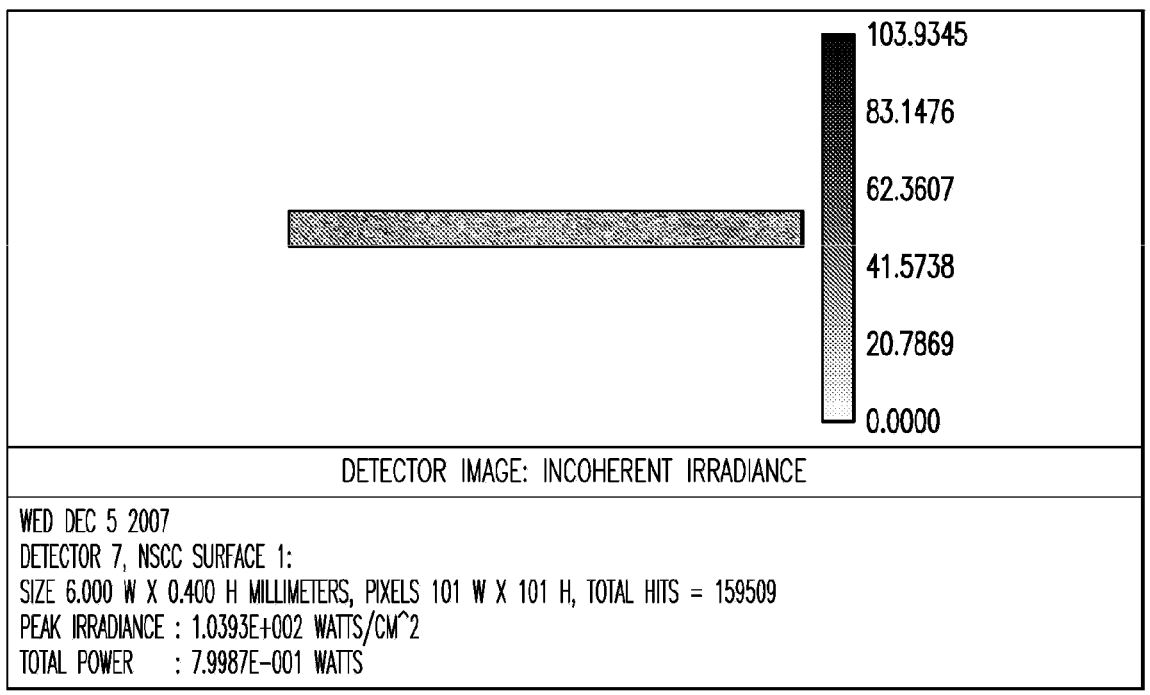
FIG. 7A shows the results of the measurement of the luminous intensity at the light guide output made by a photometric sensor.

FIG. 7A shows the results of the luminous intensity measurement by the photometric sensor at the light guide output. It is noted that this intensity is substantially uniform in the entire section of light guide 30 and represents 80% of the initial luminous power injected into guide 30 by light emitting diode 38.

Figure 7B:
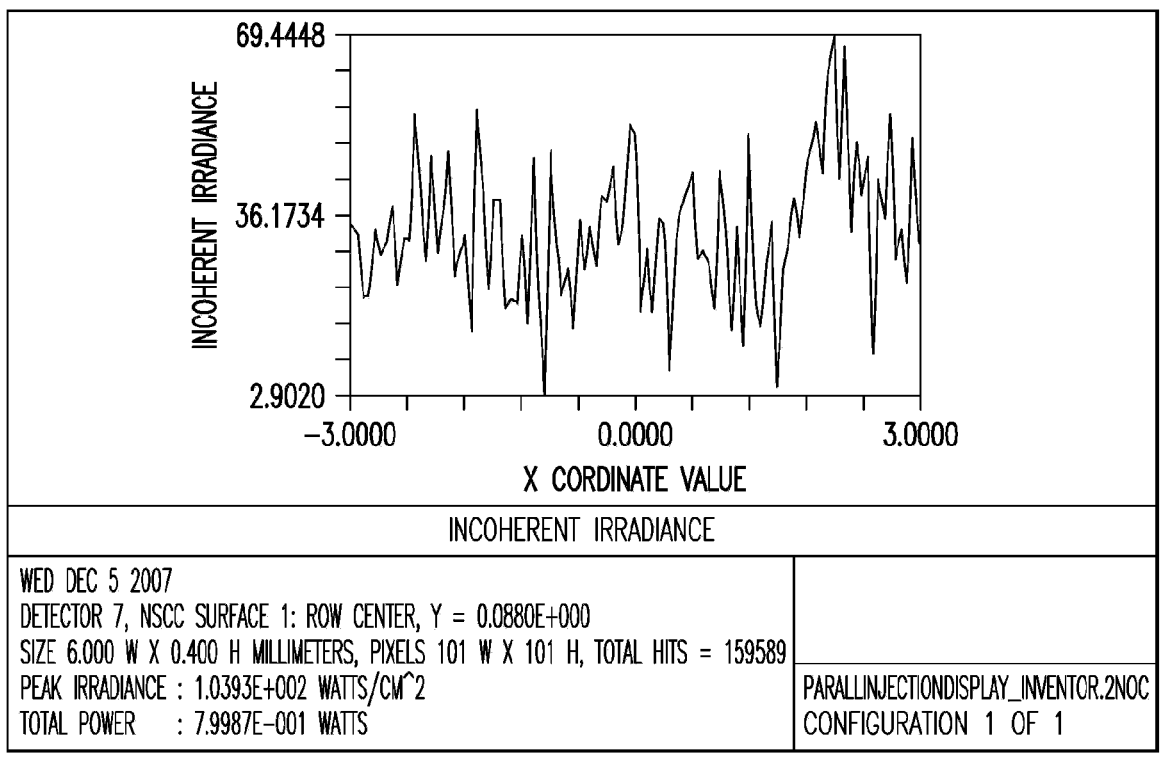
FIG. 7B shows the distribution of luminous intensity along a horizontal axis on the surface of the photometric sensor.

Let (x, y) be an orthogonal reference frame extending in the plane of the sensor, the "x" axis extending along the width of the sensor and the point x=0, y=0 being the centre of the sensor. FIG. 7B shows the distribution of intensity along the "x" axis with y=0. It is noted that the signal exhibits fluctuations but that the mean value thereof is substantially constant. The fluctuations observed are due partly to noise but also to the fact that the digital simulation only happens on a finite number of light rays. Consequently, if the simulation is performed a second time, it is entirely possible for a sensor pixel which, in the preceding simulation was displaying a lower value than the mean value, to display, in the following simulation, a higher value than the mean value.

Figure 8A:
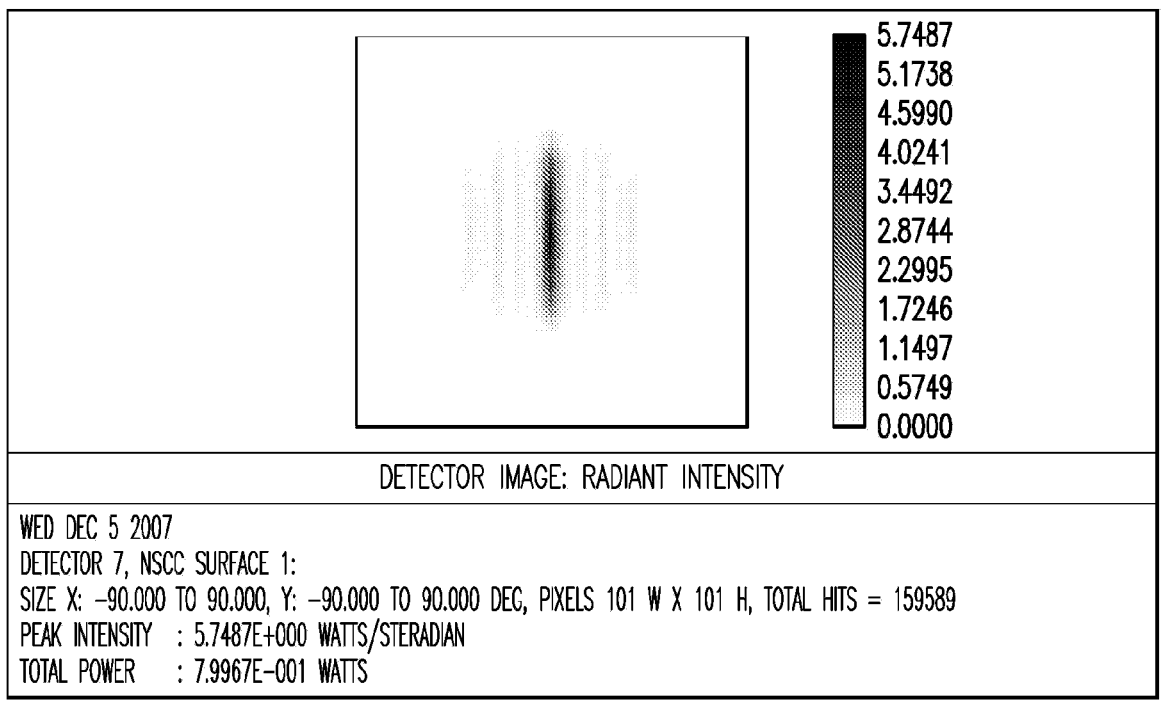
FIG. 8A shows the results concerning the statistic distribution of angular incidences of light rays at the surface of the photometric sensor.

FIG. 8A shows the results concerning the statistical distribution of the angular incidences of light rays at the surface of the photometric sensor. This distribution is obtained by measuring the angle formed by the vector associated with the light ray when it strikes the photometric sensor surface. The point x=0, y=0 is a ray that strikes the surface of the sensor perpendicularly. The direction "x" characterizes the angle formed by the light rays propagating inside guide 30 with the axis of symmetry of the guide. In this direction, it is noted that the angular distribution is very close to x=0; most of the rays thus propagate parallel to the axis of light guide 32 with a maximum deviation of 8 to 9° and thus strike the surface of the sensor at an angle of close to 90°. In the "y" direction, a wide statistical distribution is observed, which is not surprising given that, in this direction, the angles of incidence are the total reflection angles of the rays on the internal surfaces of the guide. There is thus a continuum of values which is, however, limited by the angle of acceptance of the guide.

Figure 8B:
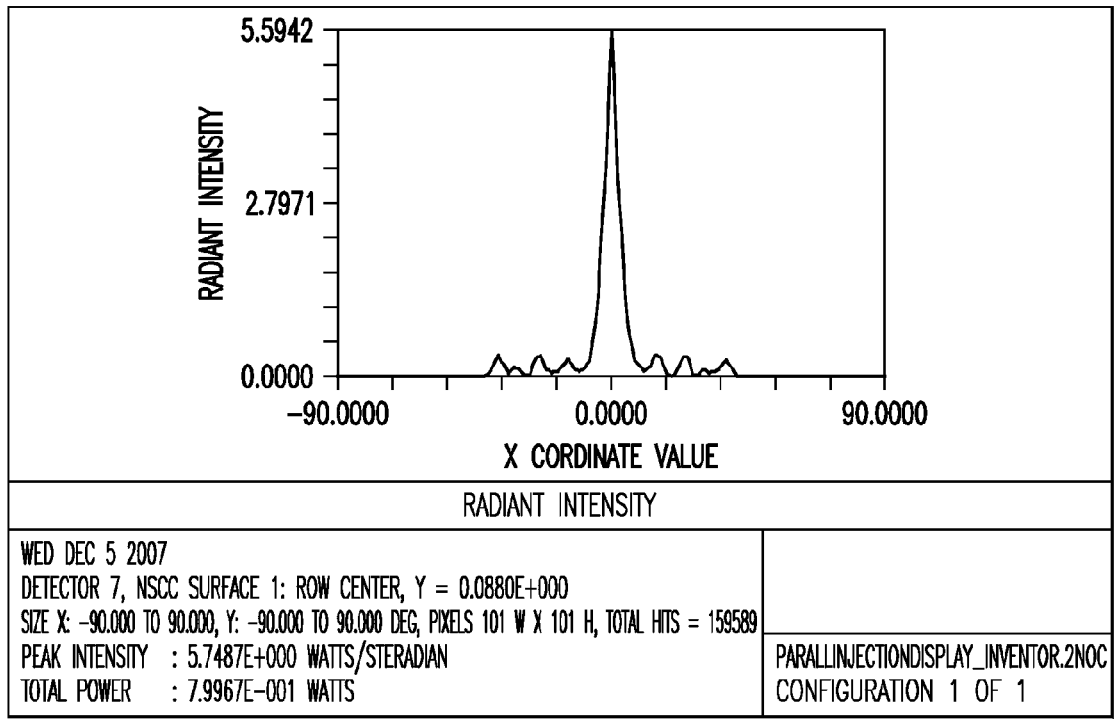
FIG. 8B is a section of the view of FIG. 8A.

FIG. 8B shows the y=0 section of the FIG. 8A view. It is noted that in the "x" direction, the angle of incidence of the rays does not exceed 10°.

Figure 9:
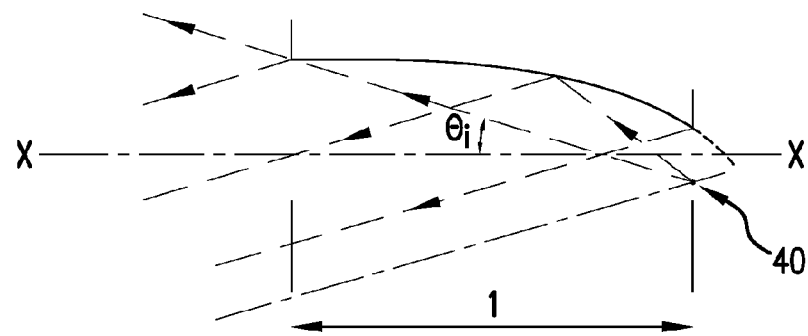
FIG. 9 is a graphic representation of the profile of the parabola.

FIG. 9 is a diagrammatic representation of the parabola profile which is defined as the central section of a parabolic concentrator known as a CPC (compound parabolic concentrator). If $\theta_i$ is the angle of acceptance of the parabola and 2a' is the parabola input diameter, then the focal length f of the parabola is:

f=a' (1+sin $\theta_i$)

the length L of the parabola is:

L=a' (1+sin $\theta_i$) cos $\theta i/\sin^2\theta_i$ and the parabola output diameter is:

a=a'/sin $\theta_i$

What is claimed is:

1. A lighting system for a data display device, said lighting system including a light guide into which the light produced by a light source is injected, said lighting system being wherein the light guide includes a plane light injection and collimation zone in the form of a parabola, said parabola including two branches connected to each other via an apex, the light source being arranged opposite the apex, the branches of the parabola which delimit the contour of the plane injection and collimation zone being extended by a plane extraction zone for the light propagating inside the guide, said extraction zone having a rectangular section and being provided with light extractors and in that, if $\theta_i$ is the angle of acceptance of the parabola and 2a' the parabola input diameter, then the focal length f of the parabola is:

f=a' (1+sin $\theta_i$)

the length L of the parabola is:

L=a' (1+sin $\theta_i$) cos $\theta_i/\sin^2\theta_i$ and the parabola output diameter is:

a=a'/sin $\theta_i$.

2. The lighting system according to claim 1, wherein an intermediate zone of trapezoidal shape is inserted between the injection and collimation zone and the extraction zone of the light guide, the trapezium being an isosceles trapezium connected via the large base thereof to the parabola branches delimiting the injection and collimation zone.

3. The lighting system according to claim 1, wherein the injection and collimation zone includes two rectilinear slots arranged on either side of the axis of symmetry of the parabola, the two slots moving away from each other in the direction of the light extraction zone.

4. The lighting system according to claim 2, wherein the injection and collimation zone includes two rectilinear slots arranged on either side of the axis of symmetry of the parabola, the two slots moving away from each other in the direction of the light extraction zone.

5. The lighting system according to claim 3, wherein the slots form an angle of 3° with the axis of symmetry of the parabola.

6. The lighting system according to claim 4, wherein the slots form an angle of 3° with the axis of symmetry of the parabola.

7. The lighting system according to claim 1, wherein a transmission zone including at least a first plane portion of rectangular shape is inserted between the injection and collimation zone and the extraction zone.

8. The lighting system according to claim 7, wherein the first plane portion is extended by a second semi-cylindrical portion, which is in turn extended by the extraction zone which extends parallel to the injection and collimation zone.

9. The lighting system according to claim 8, wherein the data display device is reflective.

10. The lighting system according to claim 9, wherein the data display device is a liquid crystal cell, an electrophoretic or cholesteric display device, a micro-opto-electromechanical system, an electro-wetting display device, or a watch dial.

11. The lighting system according to claim 1, wherein the light source is a pinpoint source.

12. The lighting system according to claim 11, wherein the light source is a light emitting diode.

* * * * *